AUTOMATIC DIALING DEVICE FOR DIAL TELEPHONES

Filed July 23, 1954 5 Sheets-Sheet 1

INVENTOR.
LEE DE FOREST
BY Zulwider Mattingly & Huntley
Attorneys

AUTOMATIC DIALING DEVICE FOR DIAL TELEPHONES

Filed July 23, 1954 5 Sheets-Sheet 2

INVENTOR.
LEE DE FOREST
BY Zulwider, Mattingly & Huntley
Attorneys

Nov. 19, 1957 L. DE FOREST 2,813,931

AUTOMATIC DIALING DEVICE FOR DIAL TELEPHONES

Filed July 23, 1954 5 Sheets-Sheet 3

INVENTOR.
LEE DE FOREST
BY
Zulwider Mattingly & Huntley
Attorneys

AUTOMATIC DIALING DEVICE FOR DIAL TELEPHONES

Filed July 23, 1954 5 Sheets-Sheet 4

INVENTOR.
LEE DE FOREST
BY Zulwider Mattingly & Huntley
Attorneys

Nov. 19, 1957 L. DE FOREST 2,813,931

AUTOMATIC DIALING DEVICE FOR DIAL TELEPHONES

Filed July 23, 1954 5 Sheets-Sheet 5

INVENTOR.
LEE DE FOREST
BY Zulwider Mattingly & Huntley
Attorneys

United States Patent Office 2,813,931

Patented Nov. 19, 1957

2,813,931

AUTOMATIC DIALING DEVICE FOR DIAL TELEPHONES

Lee DeForest, Los Angeles, Calif.

Application July 23, 1954, Serial No. 445,401

5 Claims. (Cl. 179—90)

This invention relates to automatic dialing devices for dial telephones and has for its object the provision of such an automatic dialing device which is adapted to be installed along side of an existing dial telephone or to be operatively assembled therewith as a unitary device.

Another object is to simplify the operation of a dial telephone by the provision of an automatic dialing means, thereby effecting a substanital saving of time and effort and eliminating mistakes usually encountered in the manual dialing of a telephone.

Still another object is to provide an automatic dialing device for dial telephones, the operation of which is controlled electrically by a punched card, the punch opening therein representing the telephone number that is to be called.

Other objects will be apparent as the invention is more fully hereinafter disclosed.

In accordance with these objects, I have devised an automatic telephone dialing device which is powered by a small electric motor and which contains a plurality of electric circuits, one for each of the usual prefix letters and digits found in most telephone numbers. Each of the circuits is adapted to be successively and automatically energized to actuate mechanisms that simulate manual actuation of the dialing mechanism of a dial telephone. At the conclusion of the dialing operations, a stop means is actuated to terminate automatic operation of the device. The entire cycle of operation of the device is controlled by a punched card, the punch openings therein representing the telephone number that is to be dialed.

The various objects and advantages of my invention will become apparent from the following description of one embodiment of my invention, and from the drawings illustrating that embodiment, in which.

Figure 1:
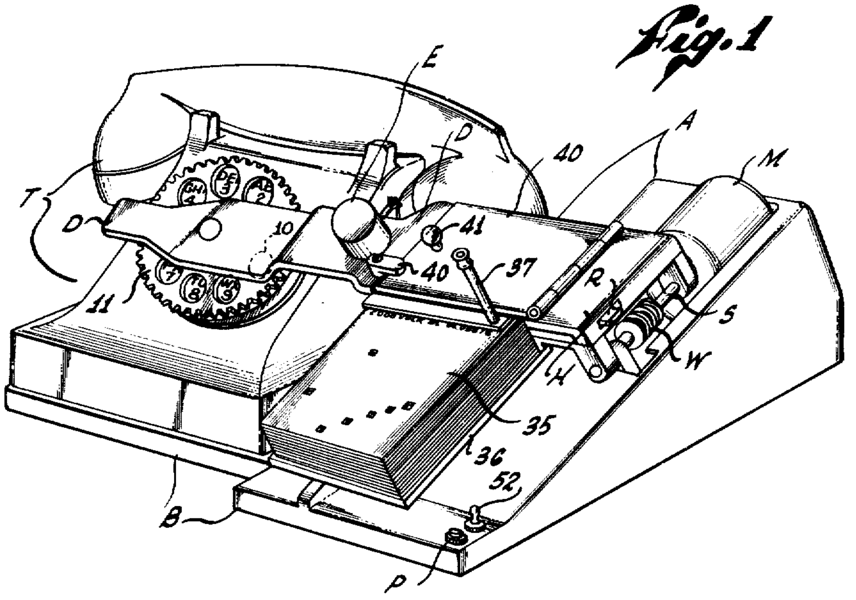
Figure 1 is a perspective view of the automatic dialing device of the present invention shown in operating position adjacent to a dial telephone of standard design.
Figure 2:
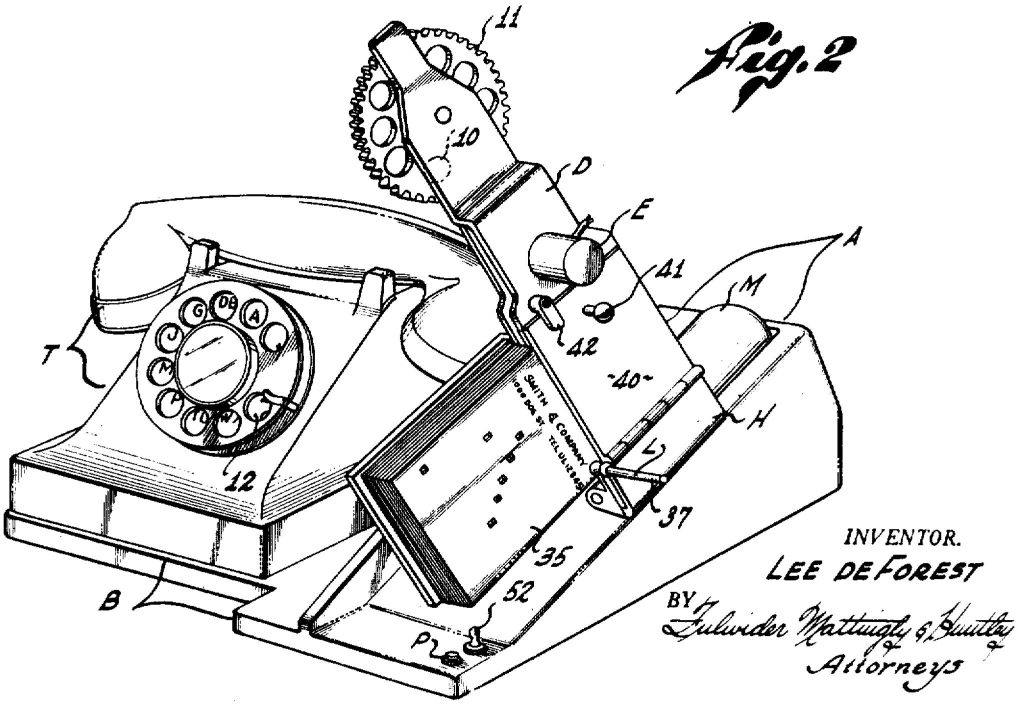
Figure 2 is a similar perspective view of the device of the present invention shown in inoperative position adjacent such a telephone whereby the dial is made accessible for manual dialing.

Referring to the drawings more particularly for identification of the various parts and operating elements comprising the present invention, it is believed clear from Figures 1 and 2 that the device of the present invention, which is generally identified by the letter A is one that is adapted to be seated adjacent to a dial telephone of standard design generally indicated by the letter T, preferably upon a common base B, which, in the specific embodiment shown, consists essentially of the base of the device A with a base plate extension thereon on which the telephone T may be seated and secured in position thereon.

The device of the present invention is powered by a small electric motor M which, in the instant specific embodiment, consists of a 10 watt, 110 volt, 60 cycle motor of standard design. The motor M drives a shaft S on which is mounted a worm wheel W. This wheel W meshes with a gear or drive wheel G (Figure 3) rotating the same in one direction at a substantially constant rate of speed. The power required to operate the automatic dialing device of the present invention is derived from this drive wheel as will hereinafter be disclosed.

The various operating elements comprising the dialing mechanism per se, including the gear or drive wheel G are all assembled upon and attached to plate D (Figures 1 and 2). This plate D is pivotally connected by a hinge H to the base B for movement into and out of operating position with respect to the dial mechanism of the phone T substantially as shown in Figures 1 and 2. It will be noted that hinge H is concentric with shaft S, and as a result the motor M remains operative and connected to the gear wheel G at all times.

The plate D is provided with a rounded extension or pin 10 carried by a rotatable gear wheel 11, and in its normal or rest position of rotation, the pin is adapted to seat within the "Z-Operator-O" opening or aperture 12 (Figure 2) of the rotatable dial mechanism of the telephone T when the plate D is in operating position, as shown in Figure 1. Rotation of this gear wheel 11, in the manner and by the means hereinafter disclosed, operates to dial successively the letters and numbers of the usual telephone number common to most telephone exchanges using the dial system.

With the above disclosure of the basic operating elements of the present invention in mind, it is believed clear that the device of the present invention provides a mechanical finger or pin means 10, that drives the dial of the telephone and which is actuated by the power drawn from motor M. The drive from the motor is transmitted through the drive shaft S and worm gear W to the driven gear wheel G to cause gear wheel 11 with its pin or finger means 10 to rotate the dial means a plurality of times about its axis. Each rotation is for a predetermined distance, and after each rotation the dial is returned to its normal or rest position. The distance or degree of each rotation of the dial means is selected and controlled to correspond to that required for dialing an individual desired letter or digit of a telephone number.

Figures 5, 6, 7:
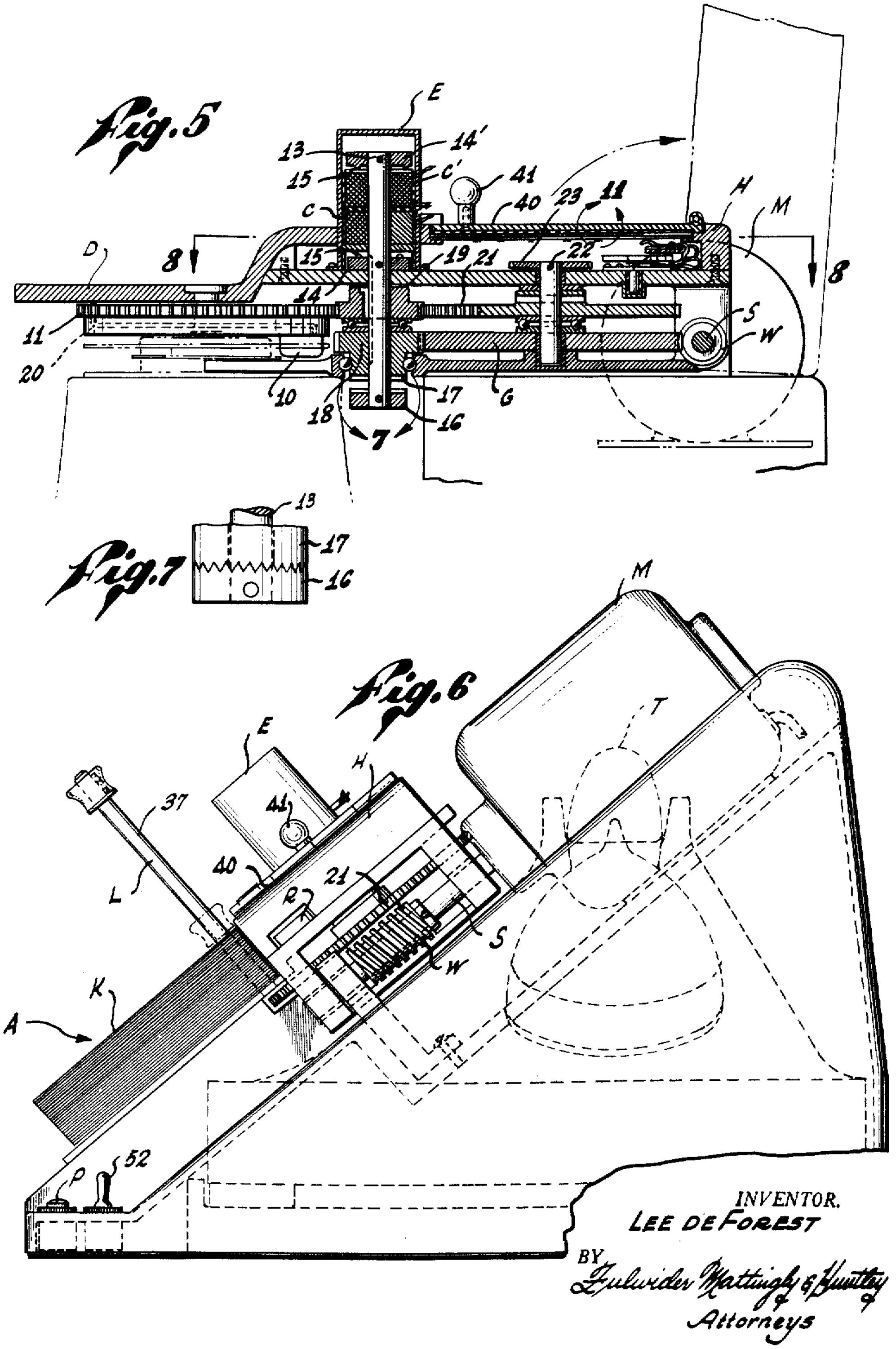
Figure 5 is a sectional view of the same taken along plane 5—5 of Figure 3.
Figure 6 is a side view of the device of the present invention.
Figure 7 is a second view of the element enclosed by circle-arrow 7 of Figure 5 showing a second operating position of the element.
Figure 9:
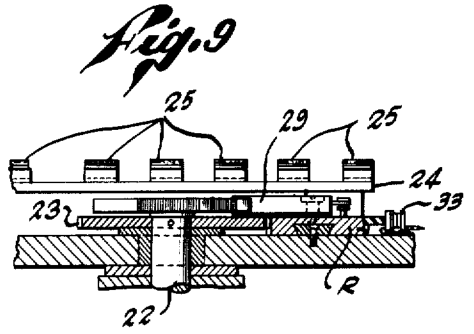
Figure 9 is a sectional view of the device taken along plane 9—9 of Figure 8.

The gear wheel 11 is caused to rotate about its axis a determined degree, thereby causing the corresponding rotation of the dialing means of the telephone, by actuation of a solenoid actuated clutch means, generally identified by the letter E. In Figure 5 the clutch means E is shown in disengaged or inoperative position, while in Figure 7 it is shown in engaged or operative position. To shift the clutch means between these two positions, I employ a pair of co-axial solenoids C and C′ that have a shaft 13 passing axially through them. Mounted upon the shaft 13 are discs 14 and 14′ rigidly attached to the shaft 13. These discs, with the shaft, comprise a permanent magnet, the discs being respectively the north and south poles thereof. The discs are so spaced upon the shaft that the upper disc is adjacent the upper solenoid C′ and the lower disc is spaced from the lower solenoid C when the clutch means is disengaged. Similarly, when the clutch means is engaged, the lower disc 14 is adjacent the lower solenoid C while the upper disc is spaced above the upper solenoid C′. Direct current is used to energize the solenoids, and since the discs are poles of a permanent magnet, they will remain in either position, because of residual magnetism, until the other solenoid is energized to drive them to the opposite position. Small non-magnetic protuberances 15 are placed upon the discs to prevent their sticking to a solenoid face despite the energization of the other solenoid. Thus, momentary energization of solenoid C will cause the clutch means to be engaged, and this engagement will continue, despite the opening of the circuit to solenoid C, until such time as upper solenoid C′ is energized.

When the clutch means E is in its engaged or operating position with the lower disc 14 adjacent the lower coil C, the shaft 13 is at its upper limit of travel, and a drive or clutch plate 16 engages a driving clutch plate 16. The driving clutch plate 16 is freely rotatable on shaft 13, and is connected to a pinion 18 which in turn is driven by gear wheel G. Driven clutch plate 16 is held to shaft 13, driving it and gear 19, concentric with and above pinion 18 in one direction (counter-clockwise). When coil C′ is energized, clutch plates 16 and 17 are disengaged, and an auxiliary spring means 20, indicated in Figure 14, drives the gear 19 and connected members back to the normal or rest position. Gear wheel 11 is constantly in mesh with gear 19, and hence the power from motor M is transmitted from shaft S and worm W to gear G and pinion 18. From the latter, it may be transmitted through clutch means E to gear 19 and then to gear wheel 11.

Most telephone numbers consist of two prefix letters and five digits, and consequently it is necessary to rotate the gear 11 a preselected number of degrees, allow it to return to its normal or rest position, and to repeat this operation until a total of seven separate rotations have been accomplished. Thereafter, the gear 11 must remain stationary until it is again set in operation by the user of the telephone. This requires a control means which, in the present case, is so designed as to cause the gear 11 to be rotated the required distance the predetermined number of times, and then cease operations until the cycle is again indicated by the operaor. In this connection, a study of Figures 3, 8, 9, and 10 will be most helpful.

Figure 8:
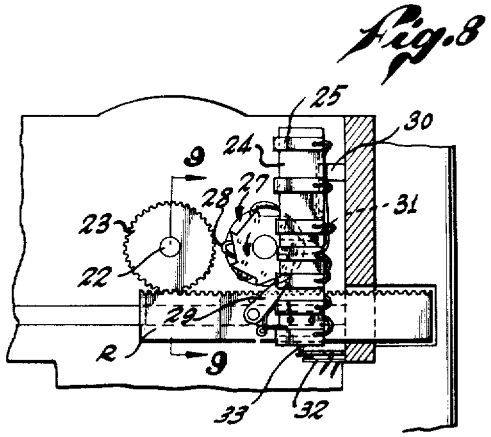
Figure 8 is a fragmentary view of the device taken along plane 8—8 of Figure 5.

In addition to driving gear wheel 11, gear 19 engages and meshes with another gear 21 of substantially the same size as gear G, concentric with the latter, but rotatable with respect thereto. Gear 21 is mounted upon a shaft 22 to drive it and a pinion 23 mounted thereon. The pinion 23 is preferably located above the gears G and 20, and engages and drives a rack R in a reciprocating motion. Thus, as best seen in Figure 8, when the clutch means E is engaged and gear 19 is driven in a counter-clockwise direction, gear 21, shaft 22, and pinion 23 will be driven in a clockwise direction and rack R will be moved to the left. Upon the disengagement of the clutch means E, the spring 20 will return the gear 19 and the other gears to their normal or rest position, thereby driving the rack R to the right.

Figures 10, 11, 12, 13:
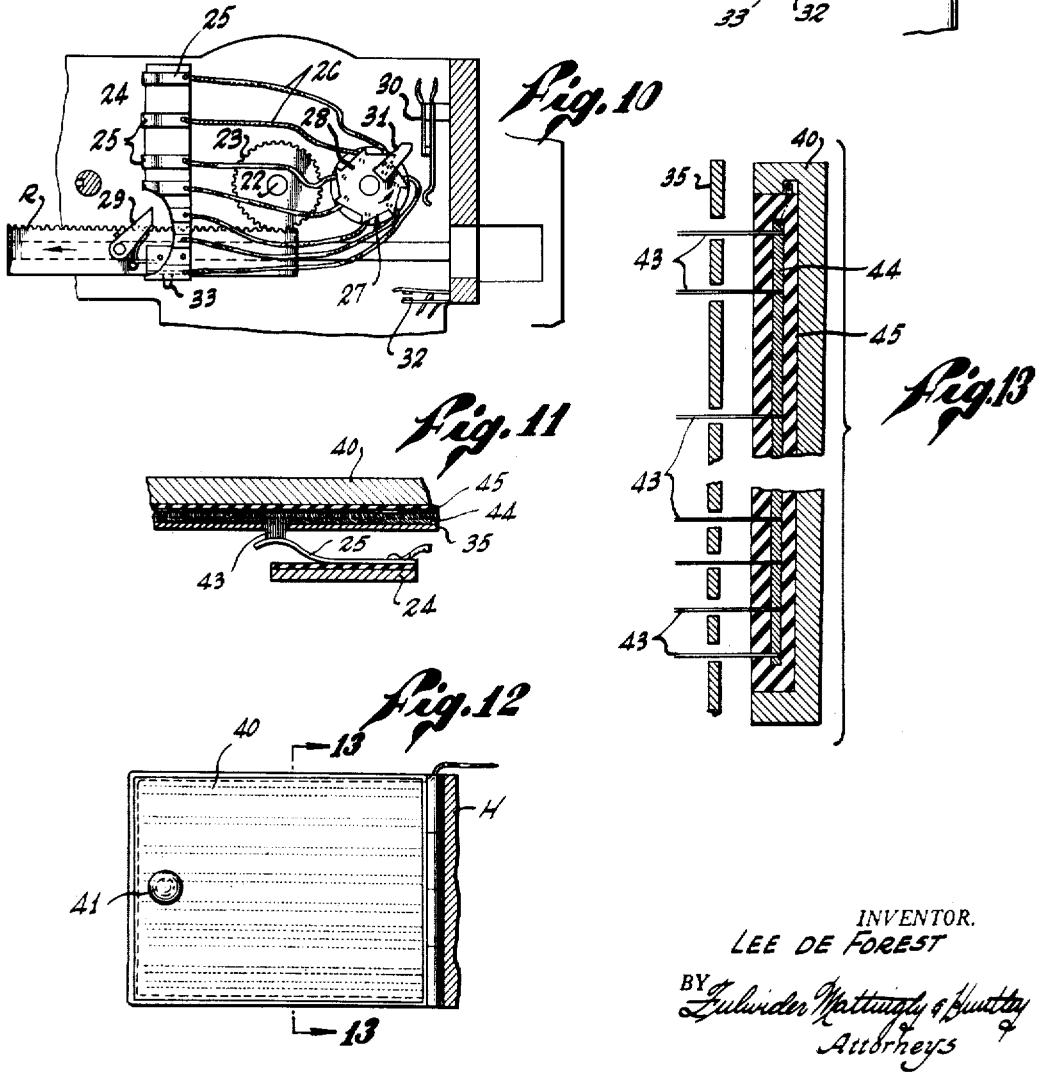
Figure 10 is a sectional view taken along plane 8—8 of Figure 5 showing the operative elements of Figure 8 in a second operating position.
Figure 11 is an enlarged sectional view of the element enclosed by circle-arrow 11 of Figure 5.
Figure 12 is a top view of one of the elements of the present invention.
Figure 13 is a sectional view of the same taken along plane 13—13 of Figure 12.

Mounted upon the rack R and moved thereby is a crossbar 24 preferably of some insulating material that carries a plurality of resilient electrical contacts 25. Each of the contacts 25 is connected by a suitable flexible conductor 26 to one terminal of multiposition switching means 27, and while the leads may be routed separately, as indicated in Figure 10, they are preferably cabled.

The switching means 24 consists essentially of a plurality of contacts equally spaced about a circle, and adapted to be engaged in sequence by a wiper carried by a ratchet wheel 28. A pawl 29 is carried by the rack R to engage and advance the ratchet 28 one notch each time the rack is returned to its normal or rest position, at the right end of its travel, as shown in Figure 8. Since most telephone numbers now include two letters and five digits, making a total of seven dialing operations to be performed, the strip 24 preferably carries a total of seven wiping contacts 25, and there are correspondingly seven conductor leads 26 leading to a corresponding number of contacts that may be engaged by the wiping arm carried by the ratchet wheel 28. Similarly, the ratchet wheel 28 is provided with seven positions around its periphery where a tooth is located, so that after seven oscillations of the rack R, the wheel is returned to its original position.

It will thus be seen that each of the contacts 25 is sequentially energized, by means hereinafter described, so that one contact is energized during the first advancement of the rack R and crossbar 24, and during the second advancement, the second contact 25 is energized.

The process is continued until the rack has advanced seven times, and all seven of the contacts 25 have sequentially been energized, it being understood that only one contact is energized at any one time. It is to be understod, of course, that while seven contacts 25 are shown, and the rack R is advanced seven times to complete one dialing sequence, the device may be arranged to provide any desired number of contacts and advancements of the rack to conform to the number of indicia in a telephone number.

As hereinafter described, the dialing sequence is started by pressing a momentary contact switch that completes a circuit to the engaging coil C of the clutch means E, thereby causing the driving of the gear 19, the gear wheel 11 and the rack R. This driving continues until the first contact 25 on the crossbar 24 completes a circuit through the card in a manner later described, whereupon the upper coil C′ of the clutch means E is energized to disengage the clutch, whereupon the spring 20 returns the various elements to their original position. Near the end of its return stroke, the pawl 29 mounted upon the rack R engages a tooth of the ratchet wheel 28 to advance the latter one position.

After the last contact 25 has been energized and the rack R is returned to its original position, the dialing sequence has been completed, and the clutch means E should not be again engaged until the momentary contact button is again pushed. I prevent the further operation of the clutch means by providing a switch 30 that is located adjacent the ratchet wheel 28 and normally acting to close a circuit. A cam or projection 31 is mounted on the ratchet wheel 28 for rotation therewith, and when the ratchet wheel is in the position corresponding to its starting or rest position, the cam 31 engages the switch means 30 to open the circuit controlled by the switch. This circuit includes the clutch engaging coil C, so that normally, with the switch 30 open, the clutch will not be engaged.

The momentary contact switch previously mentioned is connected in parallel with this switch 30 so that the start of a dialing sequence can be effected by the operator.

It will be realized that the clutch means E is engaged by momentary energization of the engaging coil C thereof, and thereafter the engagement continues until such time as the disengaging coil C′ is energized. As previously mentioned, the energization of the coil C′ is controlled by the wipers 25 and their associated circuitry, and this engagement and disengagement constitutes one cycle of the dialing sequence. The succeeding cycle must be initiated by the closing the circuit to the engaging coil C, and in all but the first and last cycles, this is effected by the closing of a normally open switch 32 that is engaged and closed by a cam or projection 33 upon the rack R. The cam 33 is so positioned that it does not close the switch 32 until the rack R has returned its normal or rest position, and thus the rack will start from this position at the beginning of each cycle, and always return to this position at the end thereof.

Figure 3:
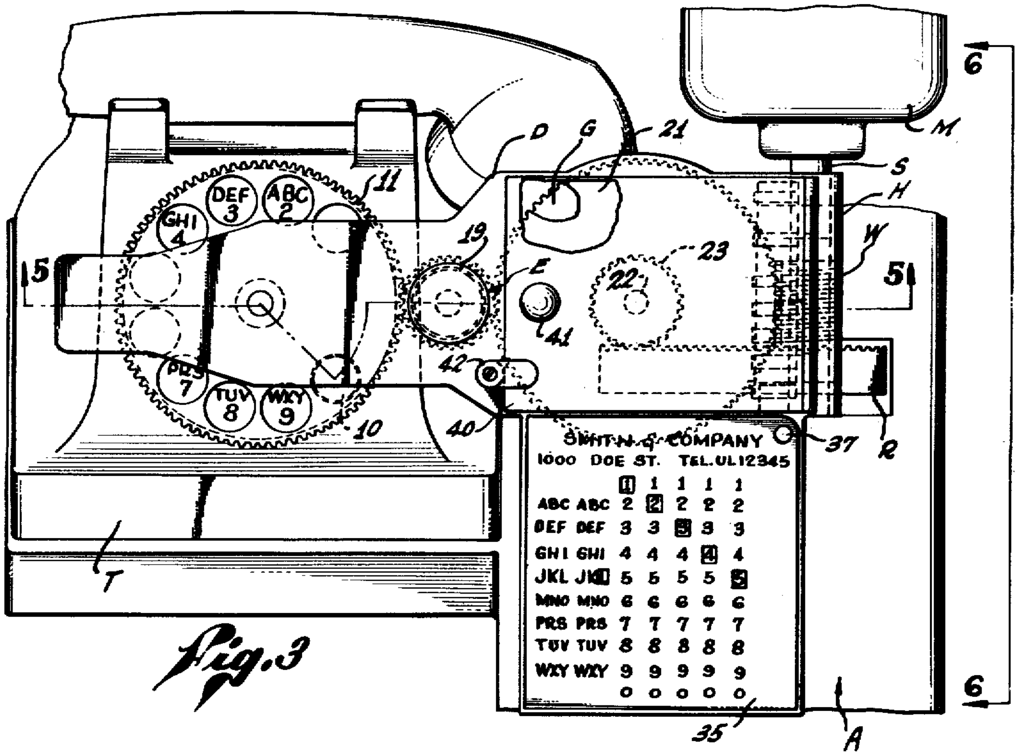
Figure 3 is a top view of the automatic dialing device of the present invention in operating position adjacent to a dial telephone of standard design.

The control of the clutch means E in such a manner as to dial the desired telephone number is provided by a card or similar member 35 having holes or apertures punched therein to correspond to the individual letters, digits, or other indicia of a telephone number. Preferably a stack of cards 35 are mounted upon an extension 36 of the arm D and are pivotally attached to the extension at one corner by means of a post 37 or similar means so that each individual card may be swung from its normal or rest position, illustrated in Figures 1 and 2, to operative position substantially perpendicular to the normal position, and indicated in Figure 4. The cards 35 are preferably of a sheet material having insulating properties, such as cardboard, and each of the cards is provided with a series of columns, corresponding to the number of letters and digits of a telephone number to be dialed. Thus, for the presently used numbers, two columns of letters will be used, the letters being arranged in groups of threes as on the dial itself, there being eight such groups in each column. The last five columns contain each of the digits from one through zero, and to mark a card to indicate a particular number, a punch is used to form an opening in each of the columns, the opening corresponding to the particular letter or digit to be dialed. Thus, as indicated in Figure 3, if the number to be dialed is UL 12345, the U of the first column is removed by a punch, as is the L of the second column. Thereafter, the numbers 1, 2, 3, 4, and 5 are removed from their respective columns by a punch, as illustrated. Preferably, each of the cards is of a sufficient size to carry the name, address, and telephone number of the telephone subscriber for whom the card is made, as well as any other pertinent information that may be desired. It will be appreciated, of course, that the cards may be removed from the post 37 as desired, in order that only current cards are retained in the stack or pile held by the post.

Figure 4:
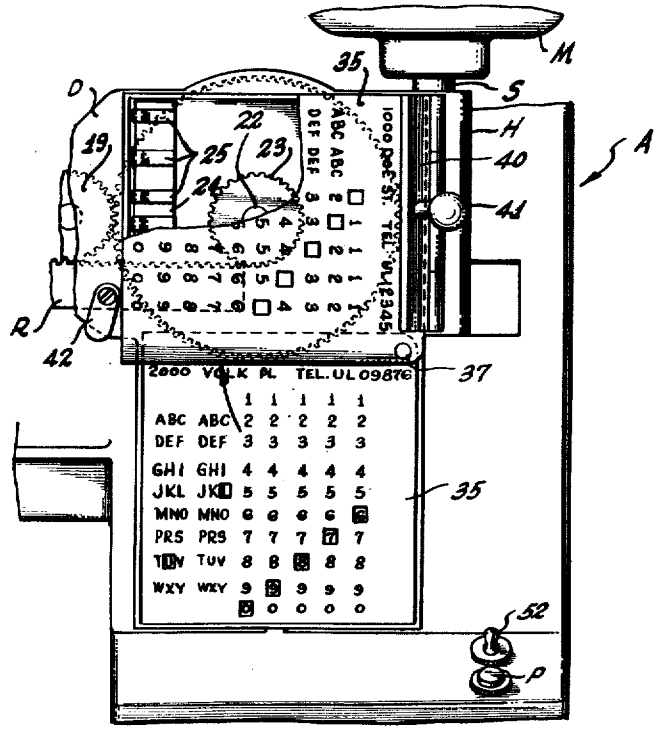
Figure 4 is a fragmentary top view of the device of the present invention partly broken away to show some of the operating elements thereof.

In their normal or storage position, the cards 35 have no effect or control on the operation of the dialing device. In order for the card to provide the necessary control, it is swung about the post 37 to a position aligned with the crossbar 24 and the contacts 25 carried thereon, as indicated in Figure 4. In this position, the undersurface of the card 35 is adapted to be engaged by the wiping contacts 25 carried by the crossbar 24, the contacts being so positioned and proportioned as to align with the various openings formed in the card.

Hingedly connected to the arm E is a cover plate 40 adapted to hold and cover the card 35 controlling the operation of the dialing sequence. A handle or knob 41 may be provided for convenience in moving the cover plate 40, and a suitable latch or holding means 42 may be provided to retain the plate in its normal or closed position.

The undersurface of the cover plate 40 is provided with resilient electrical conducting members 43 that are adapted to be deflected and held against the upper surface of the card 35, and to project through the holes punched through the card where these holes are located. The resilient conductors 43 may be formed from a large number of fine wires that project from a base 44 much in the manner that the nap of a rug projects from its base or backing. As an alternative form, a conducting layer may be applied to a resilient compressible material, such as some of the forms of rubber, etc., and by using a thin, stiff card 35, the conducting layer will be caused to extend through the hole within the card a sufficient distance for the contacts 25 to touch the bulging surface of the conductor and complete a circuit. However, the use of the large number of very fine resilient wires is a very satisfactory method of construction.

All of the conductors 43 are connected to a backing member 44 that acts as a single electrical contact for all of the conducting members. However, the backing member 44 is insulated from the cover plate 40 by enclosing or encasing it in a suitable material 45, such as a suitable plastic. As indicated in Figures 12 and 13, it is not necessary that the entire undersurface of the plate 40 be covered with the electrical conductor 43, but instead they may be arranged in strips that correspond to the columns of indicia upon the card 35.

Figure 14:
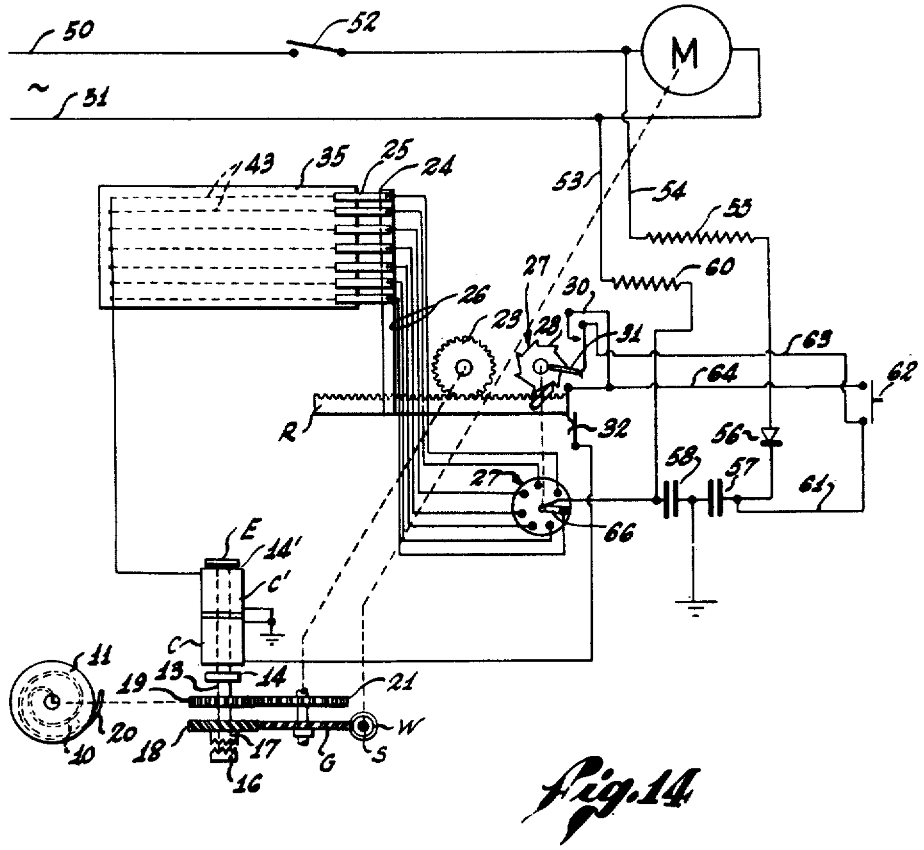
Figure 14 is a schematic diagram of the electrical control system involved in the device of the present invention and of the mechanical elements thereof arranged for ready understanding by those skilled in the art.

As previously indicated, the conductor 43 extends through the openings in the card 35, and the crossbar 24 is advanced along the undersurface of the card until the energized contact 25 carried by the crossbar engages one of the corresponding conductors 43. When this occurs, a circuit is completed to the disengaging coil C′ of the clutch means E, and the rack R is returned to its original position. The circuit controlling the various elements and including the conductors 43 and contact 25 is illustrated in Figure 14.

As shown therein, a pair of power supply leads 50 and 51 are connected through a main switch 52 to the motor M. The various other switches and control devices are also energized by closure of the switch 52, through a pair of leads 53 and 54. Connected in series with the lead 54 is a voltage dropping resistor 55 and a rectifier 56 such as the Germanium diode type, selenium disc, etc. From the rectifier 56 connection is made to a pair of current-storage, impulse-smoothing capacitors 57 and 58 connected in series, the power circuit then being completed from capacitor 58 through a voltage dropping resistor 60 to the other power conductor 53. The midpoint or common connection of the capacitors 57 and 58 may be connected to a common conductor or grounded to the frame of the dialing device.

From the common point connecting the capacitor 57 to the rectifier 56, I make an electrical connection by means of a conductor 61 to one terminal of a momentary contact switch 62. From that same terminal of the switch 62 a connection is made by conductor 63 to one terminal of the cam operated sequence control switch 30 operated by the ratchet wheel 28. The other terminal of the switch 30 is connected to one terminal of the cycle controlled switch 32 operated by the rack R, and the remaining terminal of the momentary contact switch 62 is also connected by means of conductor 64 to the same terminal of the cycle switch 32. The remaining terminal of the cycle switch is connected to one terminal of the engaging coil C of the clutch means E, the other terminal of that coil being connected to the common conductor or grounded. Thus, when the rack R is in its normal or rest position, the cycle switch 32 is closed, and closure of the momentary contact switch 62 will complete a circuit from one side of capacitor 57, through conductors 61 and 64, switch 32, and coil C of clutch means E and then through the common connector or ground back to the other side of capacitor 57. It will be appreciated that since the capacitors 57 and 58 are connected in series across the power supply and rectifier circuit including the resistors 55 and 60 and the rectifier 56, the capacitors 57 and 58 may be considered as a source of direct current energy.

When the sequence switch 30 is closed, by reason of the rotation of the ratchet wheel 28 from its initial position, the switch 62 no longer need be pressed, since the clutch engaging coil C will be energized each time rack R is returned to its rest position, thereby closing cycle switch 32.

The disengaging coil C′ of the clutch means E has one of its terminals likewise connected to the common or ground connection, and the other terminal connected to the conductors 43 carried by the cover plate 40. As previously described, a circuit is connected to one of the contact members 25 carried by the crossbar 24 when the contact reaches an opening in the card 35 through which one or more of the conductors 43 projects. The contacts 25 are separately connected through conductor 26 to a switching means 27 where a plurality of contacts are sequentially engaged by a contact arm 66, driven by the ratchet wheel 28 and connected to the junction of capacitor 58 and resistor 60.

Thus, the disengaging coil C′ is controlled by the completion of a circuit between the movable wiping contact 25 with one of the conductors 43. It will further be noted that capacitor 57 acts, in effect, to provide the power for the engaging coil C, while capacitor 58 correspondingly acts to provide the power for disengaging coil C′. Each of the coils is only momentarily energized, and at no time are both coils simultaneously energized.

From the foregoing, it is believed apparent how the operation of my automatic dialing device is effected and controlled. It will be appreciated that this device is most useful for dialing numbers that are frequently called, where it is worthwhile to make a punched card for the particular telephone subscriber. On the other hand, for numbers less frequently called, or for numbers not having the required number of indicia to be dialed, the hinged arm D may be swung upwardly to disengage the dial of the telephone and permit normal dialing operations in the usual manner. No electrical connection is made to the telephone, and only a releasable mechanical connection is made thereto. The device will find considerable use in offices and organizations where certain numbers are very frequently called and will be found particularly useful where a number is to be repeatedly dialed until it is no longer busy, and a circuit can be established.

From the foregoing, it will be seen that I have provided an automatic dialing device fully capable of achieving the objects and securing the advantages heretofore set forth. Similarly, it will be apparent that modifications may be made in my device that in no wise depart from the broad concepts thereof, such changes being apparent to those skilled in the art. Consequently, while I have shown and described a preferred form of my invention, I do not wish to be restricted to the particular form or arrangement of parts herein described and shown, except as limited by my claims.

I claim:

1. An automatic dialing device for dial telephones which includes: dial engaging means; motor means adapted to drive said dial engaging means in one direction; spring means urging said dial engaging means in the opposite direction; control means including a card-like member having a plurality of physical means positioned thereon to indicate corresponding indicia to be dialed; reciprocating means moved across said card-like member in synchronism with said dial engaging means, adapted to engage said physical means; and circuit means adapted to be operated by the engagement of said reciprocating means and said physical means to stop the driving of said dial engaging means by said motor; and means operative to drive said reciprocating means a plurality of times to engage said physical means seriatum.

2. An automatic dialing device for dial telephones which includes: dial engaging means; motor means adapted to drive said dial engaging means in one direction; clutch means adapted to connect said motor means to said dial engaging means for rotation of the latter, said clutch means including a pair of solenoids each having a permanently magnetized armature associated therewith, the energization of either solenoid acting to attract its armature and hold the armature of the other solenoid spaced therefrom, said armatures being connected to said clutch means for operation thereof; control means including a card-like member having physical means positioned thereon to indicate an indicia to be dialed; reciprocating means moved across said card-like means and in synchronism with said engaging means, adapted to engage said physical means; and circuit means adapted to be operated by the engagement of said reciprocating means and said physical means to disengage said clutch means.

3. An automatic dialing device for dial telephones which includes: dial engaging means; motor means adapted to drive said dial engaging means in one direction; spring means urging said dial engaging means in the opposite direction; clutch means adapted to connect said motor means to said dial engaging means for rotation of the latter, said clutch means including a pair of solenoids each having a permanently magnetized armature associated therewith, the energization of either solenoid acting to attract its armature and hold the armature of the other solenoid spaced therefrom, said armatures being connected to said clutch means for operation thereof; control means including a card-like member having a plurality of physical means positioned thereon to indicate corresponding indicia to be dialed; reciprocating means moved across said card-like means and in synchronism with said dial engaging means, adapted to engage said physical means; circuit mans adapted to be operated by the engagement of said reciprocating means and said physical means to disengage said clutch means; means operative to drive said reciprocating means a plurality of times to engage said physical means one at a time and in sequence.

4. An automatic dialing device for dial telephones which includes: supporting means selectively positionable to overlie the dial of said telephone or to be removed therefrom; dial engaging means engaging said dial when said supporting means is in overlying position; motor means adapted to drive said dial engaging means in one direction; spring means urging said dial engaging means in the opposite direction; clutch means adapted to connect said motor means to said dial engaging means for rotation of the latter, said clutch means including a pair of solenoids each having a permanently magnetized armature associated therewith, the energization of either solenoid acting to attract its armature and hold the armature of the other solenoid spaced therefrom, said armatures being connected to said clutch means for operation thereof; control means including a punched card having a plurality of holes positioned thereon to indicate corresponding indicia to be dialed; reciprocating means moved with said dial engaging means and across said card to complete a circuit through one of said holes; circuit means adapted to be operated by the completion of said circuit through one of said holes; and means operative to drive said reciprocating means a plurality of times to engage said physical means one at a time and in sequence.

5. An automatic dialing device for dial telephones which includes: dial engaging means; motor means adapted to drive said dial engaging means in one direction; clutch means adapted to connect said motor means to said dial engaging means for rotation of the latter, said clutch means having a pair of solenoids operative to shift said clutch between engaged and disengaged positions; a perforated card having a plurality of perforations therein representing the indicia of a telephone number; a cover plate seated thereon carrying on its under surface a plurality of electrical conductors covering the entire punching area of said card; a cross bar on said rack disposed to reciprocate therewith directly under said card; a plurality of contacts on said cross bar, one for each of said indicia on said card, each of said contacts being arranged to make wiping contact with the under surface of said card along the punched areas thereof and to make electrical contact with said electrical conductors through the punch hole openings therein; a plurality of contact points, one for each of the contacts in said cross bar; means connecting each of said contacts to a corresponding one of said contact points; a ratcheting contact arm; a pawl on said rack to ratchet said ratcheting contact arm to a next position upon each return of the rack to first position; an electrical circuit including said ratcheting contact arm, said contact points, cross bar contacts and cover plate conductors to energize said clutch disengaging coil of said solenoid actuated clutch means; a first cam actuated switch means, actuated by a cam means on said rack as said rack returns to first position, operative to close another electrical circuit including the solenoid coil operative to close the said clutch means; and a second cam operated switch means, operated to de-energize said first cam actuated switch means when the said ratcheting member has rotated 350 degrees.

References Cited in the file of this patent

UNITED STATES PATENTS

| | | |
|---|---|---|
| 1,882,106 | Wise | Oct. 11, 1932 |
| 2,044,470 | Devaux | June 16, 1936 |
| 2,195,519 | MacKenzie | Apr. 2, 1940 |
| 2,318,467 | Demeulenaere et al. | May 4, 1943 |
| 2,656,417 | Kilburg | Oct. 20, 1953 |

UNITED STATES PATENT OFFICE

CERTIFICATE OF CORRECTION

Patent No. 2,813,931

November 19, 1957

Lee DeForest

It is hereby certified that error appears in the printed specification of the above numbered patent requiring correction and that the said Letters Patent should read as corrected below.

Column 8, line 5, after "with said" insert --dial--.

Signed and sealed this 18th day of February 1958.

(SEAL)
Attest:
KARL H. AXLINE

Attesting Officer

ROBERT C. WATSON
Commissioner of Patents